(12) United States Patent
Sloan

(10) Patent No.: US 10,577,516 B1
(45) Date of Patent: Mar. 3, 2020

(54) LONG TERM PROTECTIVE COATINGS

(71) Applicant: Donald D. Sloan, Platte City, MO (US)

(72) Inventor: Donald D. Sloan, Platte City, MO (US)

(73) Assignee: Donald D. Sloan, Trustee of the Donald D. Sloan Trust, Platte City, MO (US)

( * ) Notice: Subject to any disclaimer, the term of this patent is extended or adjusted under 35 U.S.C. 154(b) by 0 days.

(21) Appl. No.: 15/597,829

(22) Filed: May 17, 2017

(51) Int. Cl.
| | | |
|---|---|---|
| *C09D 127/12* | (2006.01) | |
| *C09D 129/10* | (2006.01) | |
| *C09D 133/14* | (2006.01) | |
| *C09D 139/06* | (2006.01) | |

(52) U.S. Cl.
CPC ......... *C09D 127/12* (2013.01); *C09D 129/10* (2013.01); *C09D 133/14* (2013.01); *C09D 139/06* (2013.01)

(58) Field of Classification Search
CPC .. C09D 127/12; C09D 139/06; C09D 129/10; C09D 133/14
See application file for complete search history.

(56) References Cited

U.S. PATENT DOCUMENTS

| | | | | |
|---|---|---|---|---|
| 4,345,057 | A * | 8/1982 | Yamabe | C08F 214/186 526/247 |
| 8,092,003 | B2 | 1/2012 | Sloan | |
| 8,742,004 | B1 * | 6/2014 | Sloan | C09D 175/04 428/421 |
| 2003/0207985 | A1 * | 11/2003 | Anderson | B82Y 30/00 524/588 |
| 2013/0224413 | A1 * | 8/2013 | Prouvost | C08J 7/047 428/35.8 |

\* cited by examiner

*Primary Examiner* — Jessica M Roswell
(74) *Attorney, Agent, or Firm* — Hovey Williams LLP

(57) ABSTRACT

Coating compositions that exhibit long-term protection of an ink image against exposure to various elements including water and sunlight are provided. The coating compositions may be used to prevent or reduce degradation of image quality due to exposure to the elements. The coating compositions may also be used as a platform permitting application of images to a substrate by a sublimation transfer process.

6 Claims, No Drawings

LONG TERM PROTECTIVE COATINGS

BACKGROUND OF THE INVENTION

Field of the Invention

The present invention is directed toward a coating composition that exhibits long-term protection of an ink image against exposure to various elements including water and sunlight. The invention is also directed towards methods of using the coating composition to prevent or hinder degradation of the quality of an ink image printed upon a substrate, especially, when the substrate is exposed to the elements, such as one might encounter in outdoor usage. The invention is further directed toward a method of permitting transfer of an ink image to a substrate via a sublimation transfer process. In such processes, the coating composition is applied to a substrate that is typically relatively non-porous and not amenable to receiving sublimated dyes. The sublimation transfer is then applied and the gasified dyes are permitted to migrate into the coating.

Description of the Prior Art

Protective coatings are used on various substrates, particularly those to be used outdoors, such as signage, to provide resistance to adverse effects caused by exposure to the elements. In particular, exposure to sunlight can cause degradation of the color density of certain pigmented or dye-based coatings, such as inks. Prolonged or repeated exposure to moisture or other chemical contaminants can also result in loss of image quality. A number of coatings are available that are applied as liquids over the image to be protected and cured. While these protective coatings may prevent image degradation for a certain amount of time, generally, these coatings themselves tend to degrade due to exposure to environmental conditions and rarely provide protection for the underlying image beyond a couple of years. Therefore, a need in the art exists for a protective coating composition that can be applied as a liquid over the image to be protected and provides long-term resistance to image quality degradation, in particular, fading of the image.

In addition, a problem exists with respect to the ability to utilize a sublimation transfer process to transfer an ink image onto relatively non-porous substrates. Ink or image transfer systems are useful in applying graphics to a wide variety of items. In certain applications, ink transfers have advantages over other types of image application systems, including direct printing systems. In some situations, the substrate or item intended to receive the image is not amenable to direct printing operations. In other situations, the volume of images to be printed makes direct printing operations, such as screen printing, economically unfeasible. The use of ink transfers also allows printing operations to be performed at a site remote from the products to which the images will be applied.

Dye sublimation transfers have also been shown to provide certain benefits as compared to direct-to-substrate printing and other types of image transfer systems, particularly in regard to fabrics. Dye sublimation transfers are created by laying down reversed imagery onto transfer paper using dye-containing inks, as opposed to pigmented inks that are used in a number of direct printing systems. The substrate and transfer paper are pressed together under high heat, often up to 400° F., and the dyes contained within the inks flash or sublimate, also referred to as "gassing". The gassified dyes then migrate into the substrate thereby transferring the image from the transfer to the substrate. Dye sublimation has the ability to provide vibrant colors and transfer of highly detailed images that are limited only by the texture of the substrate and the resolution of the printer used in the manufacture of the transfer.

However, certain native substrates, such as metals, glass, and various plastic materials are not amenable to sublimation transfer processes as they are not sufficiently porous to permit the gasified dyes to penetrate into the substrate or sufficiently adhere to the substrate. Therefore, a need exists for a way of treating these substrates so as enable them to better receive images via a sublimation transfer process.

SUMMARY OF THE INVENTION

Embodiments of the present invention overcome the above problems by providing a coating composition that is capable of providing long-term protection for images as well as providing a platform for performing dye sublimation image transfer processes on a wide variety of substrates.

According to one embodiment of the present invention, there is provided a coating composition comprising one or more polymer resins comprising alternating fluoroethylene and alkyl vinyl ether segments. The coating composition may be formulated as either a catalyzed formulation in which a melamine crosslinking agent initiates curing of the coating, or as a UV-curable formulation in which one or more photoinitiators are employed to initiate free-radical polymerization reactions amongst certain monomeric, oligomeric, and/or polymeric components making up the coating.

In one particular embodiment of a catalyzed formulation, the coating composition comprises one or more polymer resins comprising alternating fluoroethylene and alkyl vinyl ether segments, one or more melamine crosslinking agents, and one or more isocyanate resins. In one particular embodiment of a UV-curable formulation, the coating composition comprises one or more polymer resins comprising alternating fluoroethylene and alkyl vinyl ether segments, one or more monofunctional acrylate monomers, one or more reactive diluents, one or more acrylate oligomers or polymers, and one or more photoinitiators.

According to another embodiment of the present invention, there is provided a method of protecting an ink image printed upon a substrate. The method comprises applying, over the ink image, a coating composition comprising one or more polymer resins comprising alternating fluoroethylene and alkyl vinyl ether segments. The coating composition is cured so as to form a protective film layer over the ink image. The coating composition used may comprise either a catalyzed or a UV-curable formulation as described herein.

According to another embodiment of the present invention, there is provided a method of preparing a surface of a substrate to receive an ink image, especially an ink image to be applied by a sublimation transfer process. The method comprises applying to at least a portion of a surface of the substrate a coating composition comprising one or more polymer resins comprising alternating fluoroethylene and alkyl vinyl ether segments. The coating composition used may comprise either a catalyzed or a UV-curable formulation as described herein. The coating composition is cured on the substrate to form a film layer of the surface of the substrate.

The prepared surface comprising the film layer can then be used in a method of transferring an ink image, formed on a sublimation transfer, onto the substrate. The substrate is provided having a surface that is coated at least in part by a film layer comprising the one or more polymer resins comprising alternating fluoroethylene and alkyl vinyl ether segments. The transfer is positioned over the surface of the substrate comprising the film layer. The transfer is heated so as to cause at least a portion of the ink image to sublime and migrate into the film layer.

Still other embodiments according to the present invention are directed toward articles comprising the film layer formed from the coating composition as described herein. The articles may comprise an ink image over which the coating composition is applied, or the articles may comprise a surface upon which the coating composition is directly applied and an ink image is subsequently transferred to the article.

DETAILED DESCRIPTION OF THE PREFERRED EMBODIMENT

As noted above, certain embodiments of the present invention are aimed at addressing problems associated with long-term weatherability of coating compositions to be applied over a base layer, such as an ink image. In other embodiments, the present invention is directed toward coating compositions that can provide a platform permitting image transfer to a substrate via a sublimation process. The coating compositions described herein are formulated with one or more polymer resins that include a vinyl or acrylic functional group. In particularly preferred embodiments, the one or more polymer resins comprise alternating fluoroethylene and alkyl vinyl ether segments (FEVE resins). One particularly preferred resin is LUMIFLON LF-916F (AGC Chemicals Americas, Exton, Pa.). In certain embodiments, the FEVE resin comprises a relatively low molecular weight, but a relatively high OH number (generally from about 80 to about 120, and preferably about 100 mg KOH/g polymer). The FEVE resin may also exhibit a glass transition temperature of from about 20° C. to about 60° C., from about 25° C. to about 50° C., from about 30° C. to about 40° C., or about 34° C. However, it is within the scope of the present invention for other acrylic or vinyl resins to be used in place of the FEVE resin in the coating formulations described herein. These resins include the NEOCRYL family of acrylic resins by DSM Coating Resins, and low molecular weight terpolymers comprised of vinyl chloride, vinyl acetate and a hyudroxylalkyl acrylate (VROH) such as UCAR VROH vinyl resin by Dow Chemical. In certain embodiments, the resins used with the present invention are preferably solid resin materials (i.e., 100% solids by weight).

The coating compositions may be formulated to cure in different ways so as to work with existing application hardware of the user. For instance, if the user's hardware is equipped with UV-curing lamps, the user may select a UV-curable coating composition. However, if the user's hardware is not so equipped, the user may opt for a catalyzed coating composition. Both types of compositions are discussed further below.

In one embodiment, the coating composition comprises components that, when mixed, initiate and/or accelerate curing of the coating composition. Generally, a crosslinking agent initiates or accelerates the formation of free radicals in certain resins that comprise the coating, which causes the resins to crosslink. Because of this, the coating composition may be formulated as two parts that are maintained separately until just prior to use. In particular embodiments, the first part comprises the one or more FEVE resins and one or more crosslinking agents. The one or more crosslinking agents comprise at least one crosslinking agent selected from the group consisting of melamine crosslinking agents and aziridine crosslinking agents. In preferred embodiments, the melamine crosslinking agent comprises an alkylated melamine-formaldehyde resin. Exemplary crosslinking agents that may be used with the present invention include Cymel 327 (a methylated high imino melamine crosslinker, 90% solids) and CX-100 by DSM (a polyfunctional aziridine crosslinker, 100% solids). In certain embodiments, the one or more crosslinking agents, and particular the melamine crosslinking agents, are formulated with isobutanol.

The coating compositions of this embodiment of the present invention, and in particular, the first part, may include one or more diluents or solvents that may be used to adjust the viscosity of the formulations to a desired level and also to disperse the various components constituting them. In preferred embodiments, the one or more diluents selected from the group consisting of dibasic ester, xylene, and combinations thereof. In particular embodiments, the dibasic ester comprises the general formula:

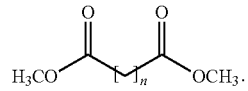

n = 2, 3, or 4

The second part of the coating composition comprises one or more isocyanate resins that undergo reaction upon intermixing with the crosslinking agent. An exemplary isocyanate resin is DESMODUR N3300A (Covestro LLC, Pittsburgh, Pa.), which is a solvent-free polyfunctional aliphatic isocyanate resin based on hexamethylene diisocyanate (HDI) having an isocyanate (NCO) content of 21.8% and <0.15% monomeric HDI.

In another embodiment of the present invention, the coating composition comprises a UV-curable formulation in which the one or more FEVE resins are formulated with one or more monomers, oligomers, reactive diluents, and photoinitiators. In certain embodiments, the UV-curable coating compositions comprise one or more monofunctional acrylate monomers. Exemplary monofunctional acrylate monomers include SR238B (Sartomer, Exton, Pa.), isobornyl acrylate, 2-phenoxyethyl acrylate (Sartomer SR-339), ethyl methacrylate, methyl methacrylate, or any combination thereof. In certain embodiments, the coating compositions may also comprise one or more multifunctional monomers such as di- and/or tri-functional monomers. As used herein, the term "mono-functional monomer" (as opposed to "bi-functional monomer", "difunctional monomer" and/or "multifunctional monomer") refers to a molecule containing one polymerizable functional group per molecule. An exemplary multifunctional monomer is 1-6-hexanediol diacrylate. In certain embodiments, the monomers used with the present invention have molecular weights ranging from about 100 g/mole to about 600 g/mole.

The UV-curable compositions also comprise one or more reactive diluents that are used to modify the viscosity of the coating composition. In certain embodiments, the reactive diluents comprise one or more monomers. The monomer may be monofunctional or multifunctional. The monomers of the diluent preferably present molecular weights of less than about 1500 g/mole, and more preferably between about 500 to about 1500 g/mole. Exemplary reactive diluents include vinylpyrrolidone and N-vinylcaprolactam.

The coating composition also comprises one or more oligomers, preferably acrylate oligomers. In certain embodiments, the one or more oligomers are operable to control viscosity, enhance durability, enhance flexibility of the coating, control adhesion of the cured coating composition to the substrate, and/or control wetting ability. In certain embodiments, the one or more oligomers are crosslinkable and/or polymerizable with one or more other components in the coating formulation. It is preferable that the one or more oligomers generally include two or more monomeric units having one or more functional polymerizable groups. An exemplary oligomer for use with the present invention includes a polyester acrylate oligomer available as CN2271E (Sartomer, Exton, Pa.).

The UV-curable coating compositions also include one or more photoinitiators. As used herein, the term "photoinitiator" refers to a compound that absorbs light energy and is responsible for the production of free radicals, which react in free radical polymerization reactions. In general, the type and amount of photoinitiator that is used with the present invention may vary depending upon the radiation or energy source to be used to cure the composition, the monomers and oligomers used, and the desired curing rate. UV-curable photo-initiators generally cure between the spectral output range of about 250 to about 410 nanometers. Exemplary photoinitiators suitable for use with the present invention include ITX (2-isopropylthiaoxanthone), Irgacure® 184 (1-benzoyl-1-hydroxycyclohexane), TPO (2,4,6-trimethylbenzoylphenylphosphineoxide), benzoin ethers such as benzoin isopropyl ether, benzyl dimethyl ketal, 2-methyl-1-[4-(methylthio)phenyl]-2-(4-morpholinyl)-1-propanone, 2-benzyl-2-(dimethylamino)-1-[4-(4-morpholinyl)phenyl]-1-butanone, mono- and bis-acylphosphines, and ESACURE ONE (Lamberti S.p.A., Italy), which is a difunctional alpha-hydroxy ketone photoinitiator.

The coating compositions formulated in accordance with the present invention, both catalyzed and UV-curable, may further include one or more optional additives. These optional additives can comprise one or more solvents, antifoaming agents, flow or other rheology control agents, optical brighteners, oils, plasticizers, binders, antioxidants, photoinitiator stabilizers, fungicides, bactericides, organic and/or inorganic filler particles, leveling agents, opacifiers, antistatic agents, dispersants, or combination thereof. Exemplary stabilizers that may be used in coating compositions according to the present invention include EVERSORB UR210 (Everlight Chemical, Taiwan), TINUVIN 123 (Bis (2,2,6,6-tetramethyl-1-(octyloxy)piperidin-4-yl) decanedioate, BASF), and IRGANOX 1520L (4,6-Bis(octylthimethyl)-o-cresol, BASF). An exemplary flow modifier is MODAFLOW Resin (Allnex), which is an acrylic flow modifier without silicone addition. An exemplary defoamer is BYK-1790, which is a silicone-free, polymer-based defoamer. An exemplary optical brightener is TINOPAL OB CO (2,5-thiophenediylbis(5-tert-butyl-1,3-benzoxazole, BASF).

In certain embodiments of the coating compositions of the present invention comprise less than 5% by weight, less than 1% by weight, less than 0.5% by weight, or are substantially free of acrylic polyol resins.

In preferred embodiments the coating compositions are provided as un-pigmented clear-coat compositions. However, it is within the scope of the present invention for the coating compositions to comprise various pigments and be formulated as opaque coatings, particularly for use in sublimation transfer processes.

In particular embodiments, the coating compositions may be formulated with metal or pearlescent powders. The metal powders can comprise any metal in a powder form such as aluminum, antimony, bismuth, bronze, cadmium, cerium, chrome, cobalt, copper, silver, gold, manganese, iron, lead, nickel, titanium, tin, tungsten, zinc, or oxides, nitrides, and carbides thereof. In certain embodiments the pearlescent pigments are comprised of mica platelets and can comprise any number of colors, including metallic colors. In particular embodiments, the powders have particle sizes of less than 50 microns, less than 40 microns, or less than 25 microns permitting them to be formulated for inkjet application.

The tables below list exemplary catalyzed and UV-curable coating formulations in accordance with embodiments of the present invention. All numerical ranges provided are approximate.

| Catalyzed formulations | | | |
|---|---|---|---|
| Component | Broad range (wt. %) | Intermediate Range (wt. %) | Narrow Range (wt. %) |
| Part A | | | |
| Dibasic ester | 5-40% | 10-30% | 15-25% |
| Resin (e.g., comprising alternating fluoroethylene and alkyl vinyl ether segments) | 15-45% | 20-40% | 25-35% |
| Xylene | 10-50% | 15-45% | 20-40% |
| Melamine crosslinker | 2.5-15% | 3-12% | 5-10% |
| Defoamer | 0.01-2.5% | 0.1-1.5% | 0.25-1.0% |
| Flow modifier | 0.1-5% | 0.25-4% | 0.5-3% |
| Part B | | | |
| Polyfunctional aliphatic isocyanate resin | 2.5-40% | 5-20% | 7.5-15% |

| UV-curable formulations | | | |
|---|---|---|---|
| Component | Broad range (wt. %) | Intermediate Range (wt. %) | Narrow Range (wt. %) |
| Monofunctional monomer (e.g., 2-PEA, IBOA) | 15-60% | 20-50% | 25-40% |
| Reactive diluent (e.g., V-pyrol) | 5-40% | 10-30% | 15-25% |
| Multi-functional monomer (e.g., HDODA) | 2.5-20% | 5-15% | 7.5-12.5% |
| Photoinitiator (e.g., 1-hydroxy-cyclohexyl-phenyl-ketone, difunctional alpha-hydroxy ketone) | 2-10% | 3-8% | 4-7% |
| Resin (e.g., comprising alternating fluoroethylene and alkyl vinyl ether segments) | 5-40% | 10-35% | 15-30% |
| Fluorescent optical brightener | 0-2.5% | 0.1-1.5% | 0.5-1% |
| Flow modifier | 0.1-5% | 0.25-2.5% | 0.5-2% |
| Antioxidant | 0.01-2.5% | 0.1-1.5% | 0.5-1.0% |
| Acrylate oligomer or polymer | 1-12% | 2.5-10% | 4-7.5% |

In certain embodiments, the aforementioned coating compositions can be applied to a substrate bearing a coating, graphical image, or other layer or film sought to be protected. In preferred embodiments, the coating composition is applied over an ink image that has been deposited on the substrate by a conventional printing process such as inkjet printing, flexographic printing, lithographic printing, screen printing, roller coating, or the like. The coating composition may also be applied through any conventional application process such as spray coating, roller coating, digital printing, screen printing, or flexographic printing. The mode of application of the coating composition may be the same as that used to apply the underlying base layer or image, or it may be entirely different. In certain embodiments, particularly when the coating composition is formulated as a catalyzed composition and provided as two separate parts, the parts are first mixed together prior to application. In such embodiments, it is desirable to avoid mixing the two parts no earlier than 8 hours, 6 hours, 4 hours, or 2 hours prior to use. Alternatively, when the coating is formulated for application via an inkjet printer, the parts may be maintained separate within the inkjet heads until discharge from the heads as disclosed in U.S. Pat. No. 8,092,003 which is incorporated by reference herein in its entirety.

Once applied, the coating composition is actively cured (e.g., through exposure to UV radiation or application of thermal energy such as passage through an oven) or passively cured through the action of one or more crosslinking agents present in the coating formulation so as to form a protective film layer over the ink image. In certain embodiments, the protective film layer has a thickness of at least 0.5 mil, at least 0.75 mil, or at least 1 mil.

The coating compositions may also be formulated as a powder coating. The powder coating compositions are formulated without a liquid carrier and have particle sizes in the range of about 2 to about 50 microns. In certain embodiments, the powder coatings are thermoset powder coatings and are formulated with a resin, preferably a crosslinker, and optionally one or more pigments. In preferred embodiments, the resin is selected from the group consisting of epoxy resins, epoxy/polyester hybrid resins, polyester resins, polyester urethane resins, and acrylic urethane resins. Most preferably, the resin is a polyester-based resin. In particular embodiments, the powder coatings comprise from about 10% to about 50% by weight, from about 20% to about 40% or from about 25% to about 35% by weight of the one or more resins. The resins, and especially polyester-based resins, contribute to improved absorption of the gasified dyes used in sublimation image transfer processes. Exemplary crosslinkers include isocyanates such as triglycidyl isocyanurate (TGIC) and amides such as beta-hydroxyl-alkyl amide (HAA). The crosslinker is preferably present in the powder coating at a level of from about 5% to about 30%, from about 7.5% to about 25%, or from about 10% to about 20% by weight. The powder coating compositions are particularly suited for application to metal surfaces. In powder coating, the metal surface is first prepared by removing oil, dirt, greases, metal oxides, etc. from the surface. Such can be accomplished via a chemical pretreatment process, or mechanical process such as abrasive blasting. After application of the powder coating, the coated substrate is exposed to elevated temperatures of at least 300° F., at least 335° F., at least 370° F., or at least 400° F., for at least 5, 7, or 10 minutes in order to cure the coating on the substrate.

Coating compositions according to the present invention can be formulated to provide any number of finishes including satin and gloss finishes.

The coating compositions can be used in connection with a wide variety of substrates including acrylonitrile butadiene styrene (ABS), styrenes, polystyrenes, cast acrylics, extruded acrylics, polycarbonates, polyethylenes, polypropylenes, polyesters, co-extruded polyesters, glycolized polyester (PETG), amorphous polyethylene terephthalate (APET), rigid vinyls, polyvinyl chlorides, metals (e.g., steel, stainless steel, aluminum, titanium, copper, tin, or alloys thereof), or ceramics.

A variety of articles can be created from the substrates bearing the protective film layer. However, given the durability of the coatings, outdoor signage is a preferred application.

Certain coating compositions according to the present invention are generally highly durable and exhibit excellent weatherability and chemical resistance characteristics. In certain embodiments, the coating compositions exhibit excellent adhesion characteristics as determined by ASTM D3359 Standard Test Methods for Measure Adhesion by Tape Test. Generally, this test method involves applying a layer of the coating composition to a particular substrate creating a lattice pattern of cuts in the cured coating, applying a pressure-sensitive tape over the lattice, and removing the lattice. Performance is then judged by how much, if any, of the coating was removed from the lattice by the tape. In particular embodiments according to the present invention, less than 5% of the coating is removed by the tape, and more preferably, none of the coating is removed by the tape. In this particular test, the coating is deposited and cured on the substrate to form a film of at least 1.0 mil thickness. The substrate used in the adhesion test may vary from rigid plastic substrates like polyethylene, polycarbonate, corrugated polyethylene, PET, HDPE, flexible vinyl films such as those used for vehicle wraps, and metallic substrates. It is noted that for the purposes of the physical performance tests described herein (e.g., various adhesion and resistance tests), a pigment, dye or other colorant may be added to the coating composition to aid visual inspection of the coating's performance.

The adhesion test may be extended to include additional challenges, such as following exposure to humidity, QUV accelerated weathering, heat aging, water immersion, and xenon arc testing. For example, the test substrate prepared as described above, may be exposed to high humidity conditions as described in ASTM D4585 for at least 500 hours, at least 1000 hours, at least 1500 hours, at least 2000 hours, or at least 2500 hours. In addition to resisting delamination from the substrate due to the humid conditions, the substrate following the humidity testing also passes the cross-hatch adhesion test described above.

In certain embodiments, the substrate prepared as described above, can also withstand at least 500 hours, at least 1000 hours, at least 1500 hours, at least 2000 hours, or at least 2500 hours of QUV accelerated weathering testing according to ASTM G154 without signs of delamination. This same substrate, after QUV accelerated weathering testing also passes the cross-hatch adhesion test.

In certain embodiments, the substrate prepared as described above can withstand at least 500 hours, at least 1000 hours, at least 1500 hours, at least 2000 hours, or at least 2500 hours of exposure to 190° F. temperatures without signs of cracking or delamination from the substrate. This same substrate, after elevated temperature exposure, also passes the cross-hatch adhesion test.

In certain embodiments, the substrate prepared as described above can withstand immersion in 90° F. water for 96 hours in a circulating bath without exhibiting signs of delamination from the substrate. This same substrate, after undergoing this water immersion challenge, also passes the cross-hatch adhesion test.

In certain embodiments, the substrate prepared as described above can withstand testing according to ASTM D3424, Standard Practice for Evaluating the Relative Lightfastness and Weatherability of Printed Matter, or ASTM D6577, Standard Guide for Testing Industrial Protective Coatings using a Xenon-Arc test apparatus. In particular, when the coating composition is applied over a colored base layer, such as a printed image, the color density of the base layer does not change (e.g., decrease) by more than 25%, by more than 20%, by more than 15%, by more than 10%, or by more than 5% after test periods of at least 500 hours, at least 1000 hours, at least 1500 hours, at least 2000 hours, at least 2500 hours, at least 3000 hours, at least 3500 hours, at least 4000 hours, or at least 4500 hours. In terms of real-world applications, the coating compositions may have a rated weatherability of at least 10 years, at least 12 years, or at least 15 years.

In certain embodiments, the substrate prepared as described above can also pass a Taber abrasion test of 3000 cycles using a 500 gram load CS 10 wheel with substantially no change in % haze or no appreciable weight loss.

In certain embodiments, the substrate prepared as described above exhibits excellent chemical and stain resistance. For example, when tested according to ASTM D1308, Standard Test Method for Effect of Household Chemicals on Clear and Pigmented Organic Finishes, using WINDEX-brand window cleaner, MR. CLEAN-brand cleanser, coffee, tea, and cola, 24 hour exposure, the substrate passes without signs of damage to the coating. Moreover, the prepared substrate is also resistant to a variety of aggressive solvents and chemicals such methylethyl ketone, automotive starting fluid, acetone, ethyl alcohol, isopropyl alcohol, heptane, vinyl acetate, ether, lacquer thinner, butyl cellosolve, windshield washer fluid, vinyl cleaner, gasoline, PLEDGE-brand furniture polish, ethylene glycol and propylene glycol antifreeze, kerosene, FORMULA 409-brand cleanser, sulfuric acid, ammonia, SPIC & SPAN-brand cleanser, potassium sulfate, chlorine, WD-40-brand lubricant, brake fluid (DOT 3), aluminum chloride, oven cleaner, rust remover, caustic soda, ARMOR-ALL-brand protectant, black streak remover, silicone lubricant, and furniture stripper. Specifically, the coating composition can be tested in accordance with ASTM D5402, and withstand at least 10, or even at least 50, rubs with a cloth or wad of cotton soaked with any of the aforementioned materials without showing visible signs of the coating being removed from the substrate.

In certain embodiments, the coating compositions of the present invention are suitable for use in heat-bending applications in which the substrate is heated to its softening temperature (a glass transition temperature in the case of plastic substrates, for example). The coating composition can tolerate bending or stretching of the substrate without cracking, delaminating, or otherwise failing.

As noted above, the coating compositions of the present invention may also be used to prepare a surface of a substrate to receive an ink image. In particular, the coating compositions may serve as a platform for transferring an ink image to the substrate via a sublimation transfer process.

As previously discussed, dye sublimation transfers are created by laying down reversed imagery onto transfer paper using dye-containing inks. The substrate and transfer paper are pressed together under high heat, preferably between 375-425° F., and the dyes contained within the inks flash or sublimate. The vapor dyes then migrate into the substrate thereby transferring the image from the transfer to the substrate. However, certain substrates, such as metals, glass, and various plastic materials are not amenable to sublimation transfer processes as they are not sufficiently porous or permeable to permit the gasified dyes to penetrate into the substrate or sufficiently adhere to the substrate. The coating compositions address this problem by being able to strongly adhere to these types of substrates, but yet permit penetration of the vapor dyes into the cured protective film layer.

Therefore, in preparing a surface of a substrate to receive the ink image by the sublimation transfer process, the coating composition is applied to at least a portion of the surface of the substrate as described above for the protective coating applications. After the coating composition has been cured and the film layer formed, the sublimation transfer is placed in contact with an image-receiving area of the article. The sublimation transfer is then heated to a temperature sufficient to cause the gassing of at least a portion of the dyes contained within the ink image on the transfer. The gasified dyes then migrate onto an image-receiving area on the surface of the substrate comprising the film layer. In certain embodiments, the heating step comprises heating the sublimation transfer to a temperature of at least 275° F., from about 275° F. to about 500° F., or from about 375° F. to about 425° F. for at least 15 seconds, or for at least 1 minute. The heating time may depend, in some degree, on the nature of the substrate receiving the image. For example, in certain embodiments, the heating step may be carried out for about 15 seconds in the case of fabric, about 60 seconds in the case of metal, or about 120 seconds in the case of porcelain or glass. The heating step may be accomplished through any suitable means, including a heated platen, iron, or press.

In certain embodiments, the dyes comprising the ink image penetrate into the film layer formed from the coating composition and become "sandwiched" between the underlying substrate and the film layer. In so doing, the image is highly protected and the articles bearing the transferred images exhibit many of the same washability, weatherability, and chemical resistance characteristics described above.

In certain embodiments, the coating compositions may comprise a pigment, such as a metallic or pearlescent pigment as described above. Not only may these coating compositions provide a platform for receiving and transferring a sublimation ink image to the substrate, the coating composition may itself form a part of the artwork. For example, the desired artwork may require coloration that is not easily transferred in the desired color density by a sublimation dye. For instance, the artwork may require an opaque white or metallic colors, for which sublimation dyes may not be most suitable. In those instances, the coating composition may be formulated with the appropriate pigment and applied to the surface of the substrate by any means disclosed herein, such as screen printing, in a selected area of the substrate. An unpigmented coating composition according to the present invention may be applied to the substrate in addition to the pigmented coating for receiving additional areas of the artwork as desired. Once the coating compositions have been applied, the remaining parts of the image may be transferred to the substrate via the sublimation transfer process described above.

Preferred substrates to be used according to this embodiment of the invention include metal, glass, polyethylene, polypropylene, polycarbonate, and ceramic substrates. In certain embodiments, the substrates are non-porous and not natively amenable to receiving images via a sublimation transfer process. Preferred applications for the coating and image transfer process include the creation of graphical images on cups and other containers, especially insulated cups made from stainless steel.

EXAMPLES

The following examples set forth exemplary compositions made in accordance with certain embodiments of the present invention. It is to be understood, however, that these examples are provided by way of illustration and nothing therein should be taken as a limitation upon the overall scope of the invention.

Examples 1 and 2 are directed to formulations that are catalyst-cured and are generally supplied in two-part form, with the two parts being intermixed just prior to application to a substrate.

Example 1: Catalyzed formulation

| | Wt. % |
|---|---|
| Part A | |
| Dibasic ester (DBE) | 20.30 |
| Resin comprising alternating fluoroethylene and alkyl vinyl ether segments (LUMIFLON LF-916F) | 30.40 |
| Xylene | 30.10 |
| methylated high imino melamine crosslinker (CYMEL 327) | 7.60 |
| a silicone-free, polymer-based defoamer (BYK 1790) | 0.50 |
| acrylic flow modifier (MODAFLOW) | 2.00 |
| Part B | |
| polyfunctional aliphatic isocyanate resin (DESMODUR N3300A) | 9.10 |

Example 2: Catalyzed formulation

| | Wt. % |
|---|---|
| Part A | |
| Dibasic ester (DBE) | 20.28 |
| Xylene | 27.60 |
| Resin comprising alternating fluoroethylene and alkyl vinyl ether segments (LUMIFLON LF-916F) | 30.42 |
| methylated high imino melamine crosslinker (CYMEL 327) | 7.60 |
| a silicone-free, polymer-based defoamer (BYK 1790) | 1.00 |
| acrylic flow modifier (MODAFLOW) | 2.00 |
| UV stabilizer (EVERSORB UR 210) | 1.50 |
| hindered amine light stabilizer (TINUVIN 123) | 0.50 |
| Part B | |
| polyfunctional aliphatic isocyanate resin (DESMODUR N3300A) | 9.10 |

Examples 3 and 4 are UV-curable formulations, which require exposure to a source of UV light in order to cure.

Example 3: Catalyzed formulation

| Component | Wt. % |
|---|---|
| 2-Phenoxyethyl acrylate (Sartomer SR-339) | 22.50 |
| Vinyl pyrrolidone monomer | 17.30 |
| Isobornyl acrylate | 17.30 |
| 1,6 Hexanediol diacrylate | 9.30 |
| 1-Hydroxy-cyclohexyl-phenyl-ketone (IRGACURE 184) | 4.00 |
| Difunctional alpha-hydroxy ketone photoinitiator (ESACURE ONE) | 2.00 |
| Resin comprising alternating fluoroethylene and alkyl vinyl ether segments (LUMIFLON LF-916F) | 20.00 |
| Fluorescent optical brightener (TINOPAL OB) | 0.10 |
| Acrylic flow modifier (MODAFLOW) | 1.00 |
| Antioxidant (IRGANOX 1520L) | 0.50 |
| Polyester acrylate oligomer (CN2271E) | 6.00 |

Example 4: Catalyzed formulation

| Component | Wt. % |
|---|---|
| 2-Phenoxyethyl acrylate (Sartomer SR-339) | 23.00 |
| Vinyl pyrrolidone monomer | 17.20 |
| Isobornyl acrylate | 17.20 |
| 1,6 Hexanediol diacrylate | 9.10 |
| 1-Hydroxy-cyclohexyl-phenyl-ketone (IRGACURE 184) | 4.00 |
| Difunctional alpha-hydroxy ketone photoinitiator (ESACURE ONE) | 2.00 |
| Resin comprising alternating fluoroethylene and alkyl vinyl ether segments (LUMIFLON LF-916F) | 20.00 |
| Acrylic flow modifier (MODAFLOW) | 1.00 |
| Antioxidant (IRGANOX 1520L) | 0.50 |
| Polyester acrylate oligomer (CN2271E) | 6.00 |

Example 5: Catalyzed formulation

| Component | Wt. % |
|---|---|
| 2-Phenoxyethyl acrylate (Sartomer SR-339) | 15.00 |
| Vinyl pyrrolidone monomer | 19.50 |
| Isobornyl acrylate | 12.00 |
| Monofunctional acrylic ester monomer (SR-420) | 14.00 |
| 1-Hydroxy-cyclohexyl-phenyl-ketone (IRGACURE 184) | 4.00 |
| Acrylic polymer (EBECRYL 1300, diluted in 70% IBOA) | 10.00 |
| Resin comprising alternating fluoroethylene and alkyl vinyl ether segments (LUMIFLON LF-916F) | 16.00 |
| Polyether siloxane copolymer flow modifier (TEGO Glide 450) | 1.00 |
| 2-Methyl-1-(4-Methylthio)phenyl-2-Morpholinyl-1-propanon (PHOTOCURE 907) | 4.00 |
| Amine coinitiator (CN 373) | 4.00 |
| Mequinol (MEHQ), stabilizer, (FIRST-CURE ST-1) (Archway) | 0.50 |

The formulation of Example 3, above, underwent accelerated weathering simulations, particular xenon-arc accelerated exposure testing. This accelerated weathering testing simulates the effects of long-term exposure of materials and coatings to varying conditions likely to be encountered during outdoor use of a product. In particular, the test substrate is subjected to varying light, moisture and heat exposure. In this particular test, inks of various colors were imprinted upon a test coupon. The formulation of Example 3 was then applied to the coupon over the ink imprints at level to give a dry film thickness of about 0.75 mil. The density of the color was measured using a densitometer after 500, 1000, 1500, 2000, 2500, 3000, 3500, 4000, and 4500 hours of accelerated weathering testing and compared with a standard. The standard was tested along with the test sample at each time interval so as to account for any variations in densitometer testing conditions. The results are provided in Table 1. In addition, the coating gloss was also measured over the same intervals and are reported in Table 2.

TABLE 1

| | Test time | | | | | | | | | | | |
|---|---|---|---|---|---|---|---|---|---|---|---|---|
| | 500 hrs | | | 1000 hrs | | | 1500 hrs | | | 2000 hrs | | |
| Colors | STD | Sample | % change | STD | Sample | % change | STD | Sample | % change | STD | Sample | % change |
| MR | 1.46 | 1.43 | −2.05% | 1.43 | 1.42 | −0.70% | 1.43 | 1.4 | −2.10% | 1.46 | 1.39 | −4.79% |
| YR | 0.98 | 0.95 | −3.06% | 0.97 | 0.92 | −5.15% | 0.98 | 0.9 | −8.16% | 0.98 | 0.88 | −10.20% |
| CG | 1.36 | 1.38 | 1.47% | 1.38 | 1.38 | 0.00% | 1.36 | 1.37 | 0.74% | 1.36 | 1.37 | 0.74% |
| YG | 0.98 | 0.95 | −3.06% | 0.98 | 0.93 | −5.10% | 0.99 | 0.9 | −9.09% | 0.99 | 0.88 | −11.11% |
| CB | 1.38 | 1.38 | 0.00% | 1.37 | 1.41 | 2.92% | 1.37 | 1.39 | 1.46% | 1.37 | 1.39 | 1.46% |
| MB | 1.44 | 1.44 | 0.00% | 1.43 | 1.42 | −0.70% | 1.43 | 1.4 | −2.10% | 1.43 | 1.38 | −3.50% |
| CMY | 1.57 | 1.34 | −14.65% | 1.32 | 1.34 | 1.52% | 1.57 | 1.33 | −15.29% | 1.57 | 1.31 | −16.56% |

| | Test time | | | | | | | | | | | |
|---|---|---|---|---|---|---|---|---|---|---|---|---|
| | 3000 hrs | | | 3500 hrs | | | 4000 hrs | | | 4500 hrs | | |
| Colors | STD | Sample | % change | STD | Sample | % change | STD | Sample | % change | STD | Sample | % change |
| MR | 1.46 | 1.35 | −7.53% | 1.43 | 1.31 | −8.39% | 1.43 | 1.3 | −9.09% | 1.43 | 1.22 | −14.69% |
| YR | 0.98 | 0.82 | −16.33% | 0.96 | 0.81 | −15.63% | 0.95 | 0.79 | −16.84% | 0.95 | 0.74 | −22.11% |
| CG | 1.36 | 1.36 | 0.00% | 1.35 | 1.36 | 0.74% | 1.35 | 1.36 | 0.74% | 1.35 | 1.34 | −0.74% |
| YG | 0.99 | 0.83 | −16.16% | 0.98 | 0.81 | −17.35% | 0.98 | 0.8 | −18.37% | 0.98 | 0.77 | −21.43% |
| CB | 1.37 | 1.34 | −2.19% | 1.37 | 1.37 | 0.00% | 1.38 | 1.35 | −2.17% | 1.38 | 1.35 | −2.17% |
| MB | 1.43 | 1.34 | −6.29% | 1.42 | 1.32 | −7.04% | 1.42 | 1.29 | −9.15% | 1.42 | 1.26 | −11.27% |
| CMY | 1.57 | 1.32 | −15.92% | 1.32 | 1.31 | −0.76% | 1.32 | 1.31 | −0.76% | 1.32 | 1.31 | −0.76% |

TABLE 2

| Test Time (hours) | Gloss reading | % change (from initial) |
|---|---|---|
| 0 | 74 | — |
| 500 | 76.9 | 3.92% |
| 1000 | 78 | 5.41% |
| 1500 | 76.9 | 3.92% |
| 2000 | 75 | 1.35% |
| 3000 | 73 | −1.35% |
| 3500 | 70 | −5.41% |
| 4000 | 70 | −5.41% |

The invention claimed is:

1. A coating composition comprising:
from about 15% to about 45% by weight of one or more fluoropolymer resins comprising alternating fluoroethylene and alkyl vinyl ether segments;
one or more melamine crosslinking agents; and
one or more isocyanate resins,
wherein the coating composition comprises less than 5% by weight of an acrylic polyol resin.

2. The coating composition according to claim 1, wherein the composition further comprises one or more diluents selected from the group consisting of dibasic ester, xylene, and combinations thereof.

3. The coating composition according to claim 2, wherein the composition comprises from about 5% to about 40% by weight dibasic ester and from about 10% to about 50% by weight xylene.

4. The coating composition according to claim 1, wherein the coating composition comprises from about 2.5% to about 15% by weight of the one or more melamine crosslinking agents.

5. The coating composition according to claim 1, wherein the coating composition comprises from about 2.5% to about 40% by weight of the one or more isocyanate resins.

6. The coating composition according to claim 1, wherein the coating composition comprises one or more additives selected from the group consisting of defoamers, flow modifiers, and light stabilizers.

* * * * *